United States Patent
Zong et al.

(10) Patent No.: US 11,784,948 B2
(45) Date of Patent: Oct. 10, 2023

(54) COGNITIVE DETERMINATION OF MESSAGE SUITABILITY

(71) Applicant: INTERNATIONAL BUSINESS MACHINES CORPORATION, Armonk, NY (US)

(72) Inventors: Dong Jun Zong, Beijing (CN); Da Li Liu, Beijing (CN); Qi Feng Huo, Beijing (CN); Yue Wang, Beijing (CN); Jing Xing, Beijing (CN); Jian Fang Zhang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 345 days.

(21) Appl. No.: 16/776,063

(22) Filed: Jan. 29, 2020

(65) Prior Publication Data
US 2021/0234816 A1    Jul. 29, 2021

(51) Int. Cl.
*H04L 51/04* (2022.01)
*H04L 51/046* (2022.01)
(Continued)

(52) U.S. Cl.
CPC .............. *H04L 51/04* (2013.01); *G06F 18/21* (2023.01); *G06N 3/047* (2023.01); *G06N 3/08* (2013.01);
(Continued)

(58) Field of Classification Search
CPC .................................. G06N 3/08; G06N 20/00
See application file for complete search history.

(56) References Cited

U.S. PATENT DOCUMENTS

| | | | | |
|---|---|---|---|---|
| 6,029,171 | A | * | 2/2000 | Smiga .................... G06Q 10/10 |
| 7,730,007 | B2 | * | 6/2010 | Salahshour ............. G06F 9/542 |
| | | | | 706/46 |

(Continued)

FOREIGN PATENT DOCUMENTS

CN    104050298 A    9/2014

OTHER PUBLICATIONS

Pennacchiotti, M. et al., "A Machine Learning Approach to Twitter User Classification," In 5th Int'l. AAAI Conf. on Weblogs and Social Media, Jul. 5, 2011, 8 pg.

(Continued)

*Primary Examiner* — Esther B. Henderson
(74) *Attorney, Agent, or Firm* — CUENOT, FORSYTHE & KIM, LLC

(57) ABSTRACT

Cognitive determination of whether a message is suitable for sending over a data communications network can include extracting tokens from the message prior to transmitting the message. One or more intended recipients of the message can be determined from the tokens. A machine learning classification model corresponding to the one or more recipients of the message can be selected. The machine learning classification model can be constructed based on tokens extracted from prior messages, which are combined to create a plurality of documents for training the machine learning classification model. The one or more tokens extracted from the message can be classified using the machine learning classification model. An alert message can be generated in response to determining based on the classifying that the message is unsuited for sending.

20 Claims, 11 Drawing Sheets

(51) Int. Cl.
| | |
|---|---|
| *G06N 3/08* | (2023.01) |
| *G10L 15/18* | (2013.01) |
| *G10L 15/22* | (2006.01) |
| *G10L 15/197* | (2013.01) |
| *H04L 51/224* | (2022.01) |
| *G06F 18/21* | (2023.01) |
| *G06N 3/047* | (2023.01) |
| *G06V 30/148* | (2022.01) |
| *G06V 30/19* | (2022.01) |
| *G06V 10/70* | (2022.01) |
| *G06V 10/82* | (2022.01) |

(52) U.S. Cl.
CPC .............. *G06V 10/70* (2022.01); *G06V 10/82* (2022.01); *G06V 30/153* (2022.01); *G06V 30/19147* (2022.01); *G06V 30/19173* (2022.01); *G10L 15/1815* (2013.01); *G10L 15/197* (2013.01); *G10L 15/22* (2013.01); *H04L 51/046* (2013.01); *H04L 51/224* (2022.05)

(56) References Cited

U.S. PATENT DOCUMENTS

| | | | |
|---|---|---|---|
| 9,256,862 | B2 | 2/2016 | Lai et al. |
| 9,542,477 | B2 | 1/2017 | Lightner et al. |
| 10,248,667 | B1* | 4/2019 | Agrawal ................ G06Q 30/00 |
| 2005/0022008 | A1* | 1/2005 | Goodman ............ G06Q 10/107 726/4 |
| 2007/0130368 | A1* | 6/2007 | Martin ................. G06Q 10/107 709/245 |
| 2014/0129510 | A1* | 5/2014 | Vladislav ............. G06K 9/6218 706/52 |
| 2015/0215252 | A1 | 7/2015 | Rackliffe |
| 2018/0091478 | A1* | 3/2018 | Jakobsson ........... H04L 63/0245 |
| 2018/0351898 | A1* | 12/2018 | Lindeman ............ H04L 51/046 |
| 2019/0173812 | A1 | 6/2019 | Higgins et al. |
| 2019/0364001 | A1* | 11/2019 | Dotan-Cohen ...... G06Q 10/107 |

OTHER PUBLICATIONS

Blei, D.M. et al., "Latent Dirichlet Allocation," Journal of Machine Learning Research, vol. 3, Jan. 2003, pp. 993-1022.

"A method to avoid sending chat messages to wrong persons or groups," IP.Com Prior Art Database Technical Disclosure, No. IPCOM000251874D, Dec. 8, 2017, 4 pg.

"Apache OpenNLP Developer Documentation," Version 1.9.1, Copyright © 2011, 2019 The Apache Software Foundation, retrieved from the Internet: <http://opennlp.apache.org/docs/1.9.1/manual/opennlp.html#tools.t>, 135 pg.

"System to prevent inappropriate message from being sent out by referring to users' relation," IP.Com Prior Art Database Technical Disclosure, No. IPCOM000251773D, Dec. 4, 2017, 4 pg.

"Intelligently avoid sending instant messages inadvertently to unintended recipients," IP.Com Prior Art Database Technical Disclosure, No. IPCOM000251785D, Dec. 4, 2017, 5 pg.

Mell, P. et al., The NIST Definition of Cloud Computing, National Institute of Standards and Technology, U.S. Dept. of Commerce, Special Publication 800-145, Sep. 2011, 7 pg.

* cited by examiner

COGNITIVE DETERMINATION OF MESSAGE SUITABILITY

BACKGROUND

This disclosure relates to data communications networks, and more particularly, to multi-party messaging over a data communications network.

Instant chat messaging and similar technologies allow users to communicate in real time over a data communications network, such as a local area network and the Internet. Using such technologies, users also can communicate using Voice over IP, share images, engage in video chats, access data using hyperlinks, and transfer files. Multiple users can establish chatrooms and engage in online chats with one another using such technologies. Similarly, cloud-based instant messaging platforms can provide an online workspace for users to work collaboratively on team projects.

SUMMARY

In one or more embodiments, a method includes extracting, with computer hardware, tokens from a message prior to transmitting the message over a communications network. The method also includes determining from the tokens one or more intended recipients of the message. Additionally, the method includes selecting a machine learning classification model corresponding to the one or more recipients of the message. The machine learning classification model can be constructed based on tokens extracted from prior messages, which are combined to create a plurality of documents for training the machine learning classification model. The method also includes classifying one or more tokens extracted from the message using the machine learning classification model. The method further includes generating an alert message in response to determining based on the classifying that the message is unsuited for sending.

In one or more embodiments, a system includes a processor configured to initiate operations. The operations include extracting tokens from a message prior to transmitting the message over a communications network. The operations also include determining from the tokens one or more intended recipients of the message. Additionally, the operations include selecting a machine learning classification model corresponding to the one or more recipients of the message. The machine learning classification model can be constructed based on tokens extracted from prior messages, which are combined to create a plurality of documents for training the machine learning classification model. The operations also include classifying one or more tokens extracted from the message using the machine learning classification model. The operations further include generating an alert message in response to determining based on the classifying that the message is unsuited for sending.

In one or more embodiments, a computer program product includes a computer readable storage medium having instructions stored thereon. The instructions are executable by a processor to initiate operations. The operations include extracting tokens from a message prior to transmitting the message over a communications network. The operations also include determining from the tokens one or more intended recipients of the message. Additionally, the operations include selecting a machine learning classification model corresponding to the one or more recipients of the message. The machine learning classification model can be constructed based on tokens extracted from prior messages, which are combined to create a plurality of documents for training the machine learning classification model. The operations also include classifying one or more tokens extracted from the message using the machine learning classification model. The operations further include generating an alert message in response to determining based on the classifying that the message is unsuited for sending.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
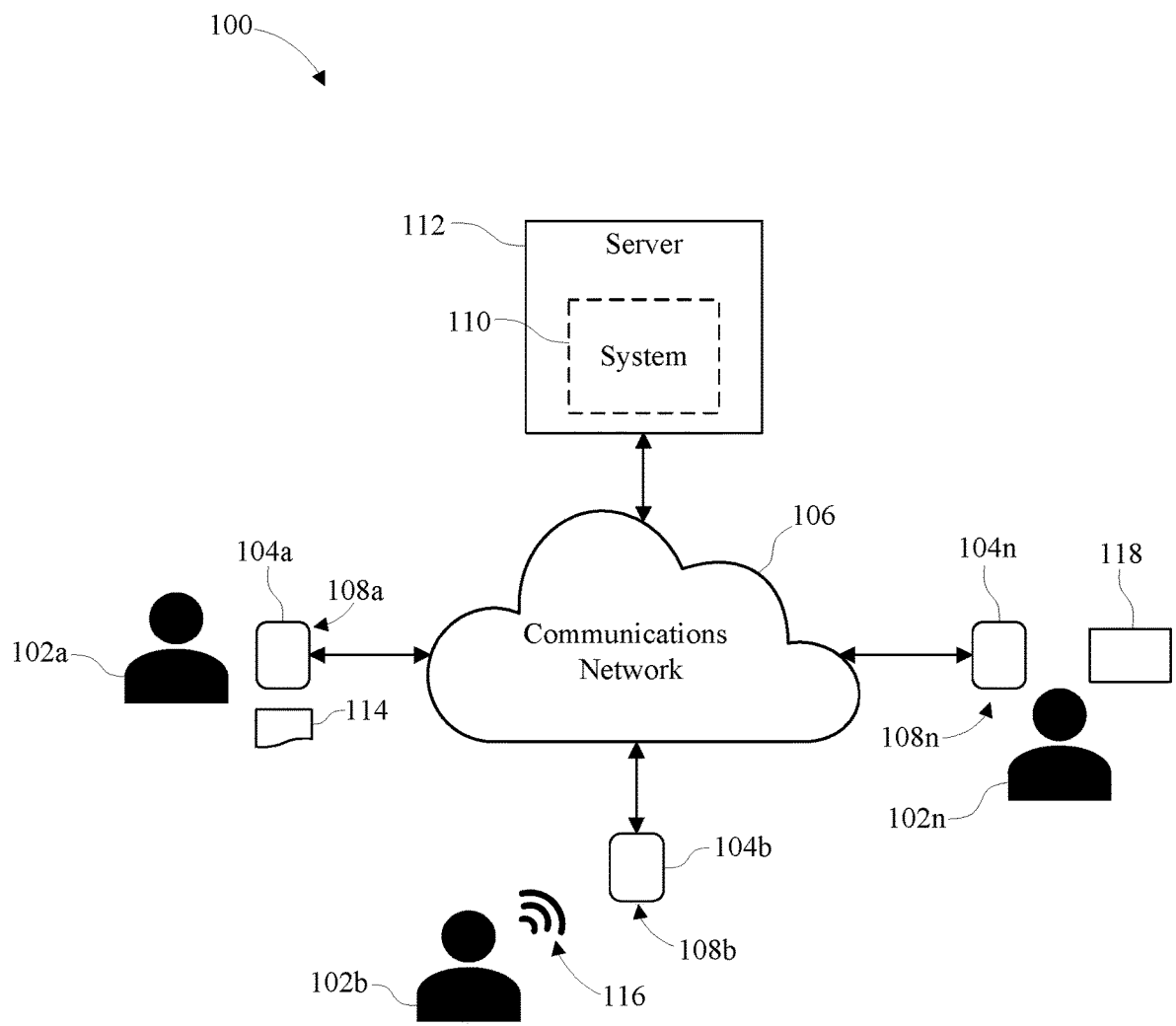
FIG. 1 depicts an example communications environment in which a system for determining message suitability operates according to an embodiment.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to data communications networks, and more particularly, to multi-party messaging over a data communications network. Notwithstanding the benefits brought by instant chat messaging and similar technologies, there can be times in which a message can lead to undesirable results. The message may use terms or reference one or more topics that offend certain sensitivities of certain individuals. The message may include an incautious comment that has previously proven problematic when conveyed to one or more members of specific group (e.g., a chat group). The message may inadvertently disclose confidential information to one or more individuals who are not part of a limited group (e.g., collaborative work group) that is authorized to receive the information.

In accordance with the inventive arrangements disclosed herein, messages unsuited for sending are automatically identified before being sent over a communications network. Among various aspects of the methods, systems, and computer program products disclosed herein are certain machine learning models that automatically learn to identify and classify messages.

In certain embodiments described herein, a machine learning model for determining message unsuitability is trained using example documents created by combining prior messages. The prior messages comprise text strings, which can be collected from text-based messages as well as from speech converted to text by a speech-to-text processor. The text strings also can be collected using the enhanced convolutional neural net image caption generator disclosed herein. The enhanced convolutional neural net image caption generator combines image recognition and machine learned topic identification capabilities. Image-related text generated by the enhanced convolutional neural net image caption generator provides an additional source of examples for training a machine learning model to determine message suitability/unsuitability, specifically with regard to messages that contain one or more images.

A system, in accordance with some embodiments, can extract one or more tokens from a message prior to transmitting the message over a communications network. The system can determine from the tokens one or more intended recipients of the message. At least one machine learning model corresponding to the one or more recipients of the message can be selected by the system, the machine learning model(s) trained with tokens extracted from prior messages that were combined to create a plurality training documents. The system can classify the one or more tokens extracted from the message using the machine learning model(s). The system can generate an alert message in response to determining based on the classifying that the chat message is unsuited for sending. To maintain the accuracy and relevancy of the machine learning model(s) for determining message suitability, new documents for training the machine learning model(s) can be created at periodic intervals over a predetermined time period based on recent messaging.

In certain embodiments, the machine learning model is a probabilistic topic model that statistically determines at least one topic that characterizes the language content of a plurality of documents. An example of a probabilistic topic model disclosed herein is an augmented latent Dirichlet allocation model. The augmented latent Dirichlet allocation model can be augmented based on a group relationship graph, as also disclosed herein.

The arrangements described herein are directed to computer technology and provide an improvement to computer technology. Specifically, the present arrangements improve messaging systems by providing for automatic recognition of messages that are not suited for sending over a data communications network. Without human intervention, such a message can be identified before the message is sent. The sending of the message can be automatically blocked before the message is sent once the message is determined to be unsuitable for sending. Overall efficiency of a messaging system is enhanced by determining message suitability/unsuitability without the need for a manual compilation of characteristics that would otherwise be necessary for making the determination. Rather, the determination can be based on the machine learning models disclosed herein, which can be trained to recognize message unsuitability without human instruction or intervention.

Further aspects of the arrangements described within this disclosure are described in greater detail with reference to the figures below. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 depicts communications environment 100, which is an example environment in which a system for determining message suitability operates in accordance with one embodiment. Communications environment 100 illustratively includes multiple users 102a, 102b, and 102n who communicate with one another using communication devices 104a, 104b, and 104n, respectively. Although only three such users and user devices are shown, it will be readily recognized that communications environment 100 can include any number of users and user devices.

Communication devices 104a-104n can comprise various types of electronic devices, including, for example, a smartphone or other mobile device, a computer (e.g., desktop, laptop, tablet computer), virtual assistant, smart TV, or other communication/computing device. It will be appreciated that in various embodiments one or more of communication devices 104a-104n can be deployed as a standalone device or deployed as multiple devices in a distributed client-server networked system. For example, in certain embodiments, a smartwatch can operatively couple to a mobile device (e.g., phone).

Communication devices 104a-104n communicatively couple with one another via communications network 106. Communications network 106 provides communication links between various devices and data processing systems. Communications network 106 can link users 102a-102n using communication devices 104a-104n, for example, to an instant messaging service, a team collaboration service, a social networking service, or similar service or messaging platform. The communication links can include connections, such as wired communication links, wireless communication links, or fiber optic cables, and can be implemented as, or include, one or more (or any combination of) different communication technologies such as a wide area network (WAN), a local area network (LAN), a wireless network (e.g., a wireless WAN and/or a wireless LAN), a mobile or cellular network, a virtual private network (VPN), the Internet, a public switched telephone network (PSTN), and so forth.

As defined herein, "communication link" means a mode of communication using one or more electronic devices. A communication link is associated with a specific format and/or communication protocol for sending messages. For example, using a specific format and/or communication protocol, an electronic device can send a message to another electronic device as a text message, an email, a video call, a voice call, and/or a post to a social networking system. A communication link for exchanging text messages is considered a distinct communication link. Likewise, a communication link for exchanging emails is a distinct communication link, as is a communication link for video calls, as is a communication link for voice calls. So, too, a communication link used for posting to a social networking system is considered a distinct communication link. That is, each type of communication link corresponding to a different type or mode of communication is considered a distinct communication link.

Illustratively, each of communication devices 104a-104n is endowed with processing capabilities and/or hardwired circuitry 108a, 108b, and 108n that connects to system 110 for determining the suitability of a message before a user sends the message via communications network 106 to one or more other users, such as members of a chat group, members of a collaborative work group, or individuals interacting over an on-line social network. System 110, for example, can be operatively coupled to or integrated in an instant messaging service, a team collaboration service, a social networking service, or similar service or messaging platform which communication devices 104a-104n are communicatively linked via communications network 106.

System 110, in certain embodiments, is implemented as a set of computer system-executable instructions illustratively executing on server 112, which communicatively couples to communication devices 104a-104n via communications network 106. Accordingly, system 110 can be implemented in various types of computer systems (e.g., cloud-based server) such as computer system 1012 described with reference to FIG. 10. In other embodiments, system 110 can be implemented in hardwired circuitry or a combination of circuitry and computer system-executable instructions. Illustratively, user 102a communicates text message 114, user 102b communicates spoken message 116, which is converted to text by a speech-to-text processor (not shown), and user 102n communicates a message containing image 118, each of which is conveyed over communications network 106 during a conversation involving an exchange of multiple messages between the specific users over a specific span of time.

Figure 2:
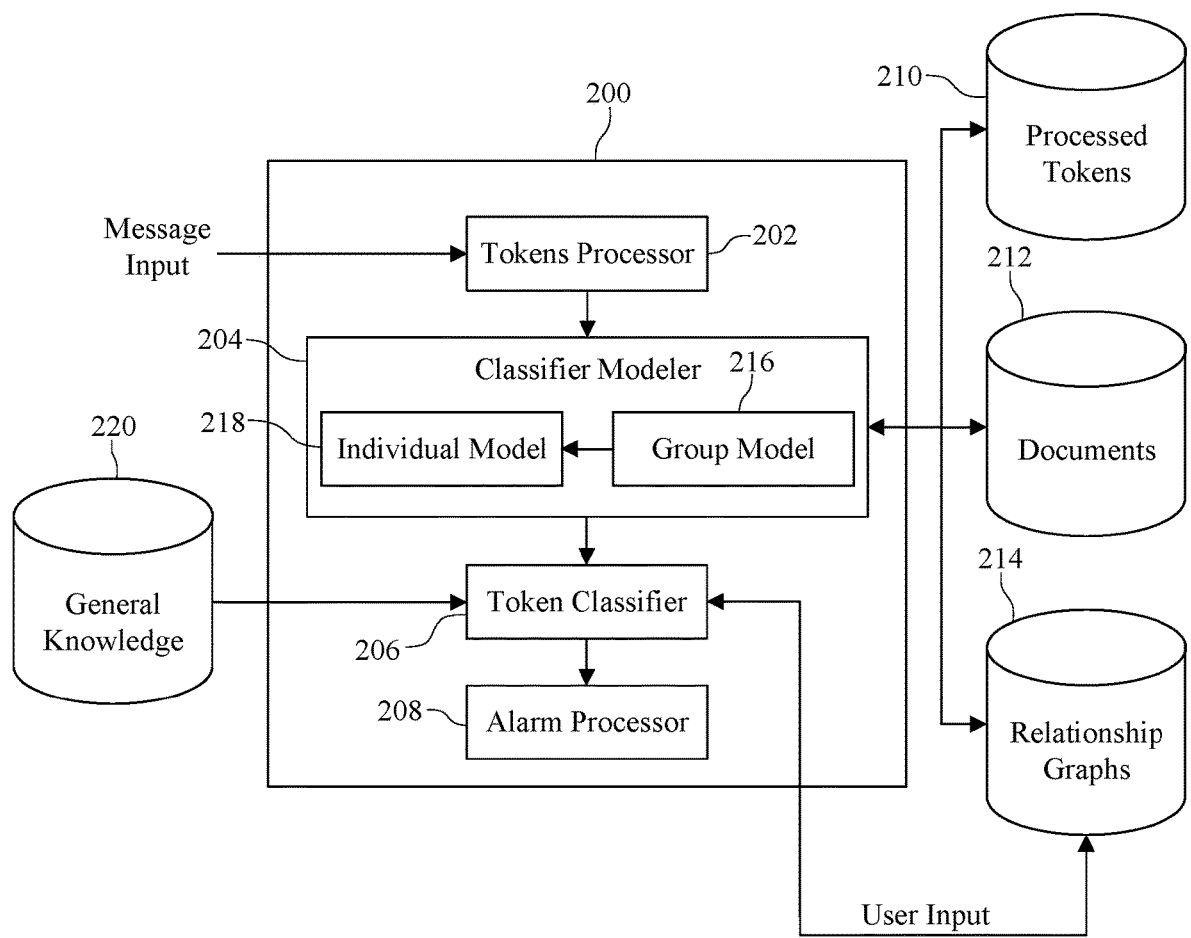
FIG. 2 depicts an example system for determining message suitability according to an embodiment.

FIG. 2 depicts example system 200 for determining suitability of a message prior to sending the message, according to an embodiment. System 200 illustratively includes token processor 202, classifier modeler 204, token classifier 206, and alarm processor 208, each of which can be implemented as a set of computer system-executable instructions, dedicated circuitry, or a combination of dedicated circuitry and executable instructions.

System 200 determines the suitability of a message based on a machine learning classification model generated by classifier modeler 204 and implemented by token classifier 206. Token classifier 206 classifies one or more words contained in the message, the words represented by tokens extracted by token processor 202 from one or more text strings comprising the message. The message can be a text-based message, in which case the text string is the message text itself. The message can be a voice-based message, in which case the text string is generated by converting the corresponding speech to text with a speech-to-text processor (not shown). The message can comprise an image, in which case one or more text strings corresponding to the image can be generated using an embodiment of the enhanced neural net image caption generator described below.

As defined herein, "text string" is a sequence of alphabetical characters, numeric characters, symbols (e.g., emoji) and/or punctuation marks. Token processor 202 segments the text string into tokens. As defined herein, a "token" is a word, number, or punctuation mark derived from the specific sequence of characters contained in a text string. Token processor 202 can identify sentence boundaries (e.g., based on punctuation and/or whitespace in the message) and identify words corresponding to tokens within the boundaries.

Token processor 202 is automatically invoked by system 200 in response to a user creating a message using a device (e.g., smartphone, computer system) that can communicatively couple to a communications network. Prior to delivery of the message to one or more recipients over the communications network, token processor 202 extracts one or more tokens (words) from the message and, based on the extracted token(s), determines one or more intended recipients of the message. System 200 invokes token classifier 206. If token classifier 206, based on the classification model generated by classifier modeler 204, determines from the tokens extracted from the message that the message is unsuitable for sending, then alarm processor 208 is invoked. Alarm processor 208 generates a message warning the user (message sender) that the message is unsuited for sending. As defined herein, "unsuited for sending" refers to a message that is determined based on the machine learning classifier model to include language (identified by tokens representing words) that is likely (statistically) to offend a recipient of the message, create misunderstanding, and/or disclose privileged or confidential information to unauthorized persons. Optionally, alarm processor 208 can automatically block the sending of a message determined to be unsuited for sending.

In certain embodiments, token classifier 206 makes a suitability-versus-unsuitability determination with respect to a message based on an association between tokens (words) extracted from the message and topics identified by a topic model generated by classifier modeler 204. The appearance within a message of words associated with topics deemed objectionable can render the message unsuitable for sending.

A message can be unsuitable for sending owing to any number of reasons having to do with a specific topic. A message may be unsuitable because the message covers a topic that offends the sensibilities of an individual or group of individuals. For example, a message concerning the topic of meat consumption shared with members of a chat group can offend chat group members who may be strict vegetarians. A message may be unsuitable because the message covers a confidential topic. For example, a message concerning a topic relating to a research and development project may be unsuitable for sending to individuals outside of a limited-member collaboration group. Express user input can mark a topic as objectionable. Alternatively, a machine learning classification model can be trained to recognize objectionable topics based on a prior exchange of messages, as described below.

The topic model generated by classifier modeler 204, in some embodiments, is a probabilistic topic model generated using machine learning. The probabilistic topic model can discover or identify topics or themes appearing in a plurality of textual documents based on the words in the documents. Connections between topics and how the topics change over time can also be determined by the probabilistic topic model.

The probabilistic topic model is generative in the sense that the model treats data as arising from a generative process that includes so-called hidden random variables. The generative process defines a joint probability distribution over both observed and hidden random variables. The joint distribution is used to compute a conditional distribution (posterior distribution) of the hidden random variables given the observed random variables. An aspect of topic modeling, therefore, is approximating the conditional distribution. The approximation can be determined using sampling-based methods (e.g., Gibbs sampling) or variational methods. In various embodiments, different probabilistic topic models can be created by classifier modeler 204. One probabilistic topic model disclosed herein is an augmented latent Dirichlet allocation model, which is described in detail below.

Classifier modeler 204 constructs a probabilistic topic model using machine learning and based on tokens extracted from prior messages. The tokens can be stored in processed tokens database 210 and annotated with one or more indicators. The indicators can indicate, for example, the time the tokens representing the message were saved ("message time"); an assigned message identifier ("message ID") used to correlate the token to the particular message from which the token was extracted; a message's author ("sender ID"); a message recipient ("recipient ID"); and/or a messaging group identifier ("group ID"), which as defined herein is an alpha-numeric sequence and/or other symbolic representation corresponding to the message sender and each message recipient. The tokenized representations of prior messages are combined to create a plurality documents corresponding to message text strings, which can be stored in documents database 212 and used for training one or more probabilistic topic models using machine learning.

Following is an example document, termed an "aggregated messages document" (AMD), created by combining or aggregating multiple prior messages exchanged over a specific time period between an identifiable group of users (e.g., chat group, collaborative work group):

| User ID | Message | Time |
|---|---|---|
| User A | Let's go out for lunch, anyone have any suggestions? | 11:00 AM |
| User B | How about barbeque at the Bar B Q restaurant around the corner? | 11:01 AM |
| User B | [image of barbeque meat platter] | 11:02 AM |
| User B | I propose we order the pork platter special for the whole team. | 11:02 AM |
| User C | That looks delicious. | 11:02 AM |
| User D | Oh, pork is indeed delicious, but two of our team members are strict vegetarians, so please do not post a message like this again. | 11:03 AM |
| User B | Sorry about that, how about pizza instead? | 11:04 AM |
| User D | Good idea, let's all go to Joe's Pizza Place for pizza at noon. | 11:05 AM |

Although the messages occur over a relatively short time span and involve an innocuous discussion regarding where the group should meet for lunch, the document highlights the fact that, as demonstrated below, an AMD can cover multiple topics for training a probabilistic topic model using machine learning.

An example probabilistic topic model generated by classifier modeler 204, in accordance with one or more embodiments, is the augmented lateral Dirichlet allocation (aLDA) model. Through unsupervised machine learning based on input comprising a set of AMDs created by combining multiple messages, the aLDA model learns to identify topics. Each AMD comprises a specific group of individuals' messages exchanged over a specific time span, as in the example above. The individuals exchanging messages define a group (e.g., chat group, collaborative work group) and the specific messages comprise messages exchanged during a specified time period.

Operatively, classifier modeler 204 generates the aLDA model by initially assigning to each token (word) a corresponding ID, such as an integer number from 1 to n where n is the size of a vocabulary. Initially, classifier modeler 204 randomly assigns a topic to each token in each document used to train the model, each topic identified by an integer from 1 to k where k is the number of topics (which can be predetermined) identified within the documents.

Classifier modeler 204 generates a topic count matrix that indicates the number of times that a particular token (word) is associated with each of k topics. The task of the aLDA is to determine based on the tokens extracted from the documents, the likely topics embodied in the messages within the documents. Classifier modeler 204 generates a document-topic count matrix, each element of which indicates the number of tokens assigned to each topic in each document. Although initially topics are assigned to each token randomly, through successive iterations an optimal allocation of tokens to topics is determined. The optimal allocation is determined by representing each document as a mixture of topics that generate words with certain probabilities and assuming that each document was generated by (1) deciding on the number of words to include in the document (e.g., based on a Poisson distribution); (2) choosing a mixture of topics for the document (e.g., based on a Dirichlet distribution over a fixed set of k topics); and (3) generating each work in the document by picking a topic and generating the word based on the topic (e.g., according to a multinomial distribution).

In one embodiment, the optimal allocation is determined by classifier modeler 204 using collapsed Gibbs sampling. Collapsed Gibbs sampling is based on the product of the probability that a word is associated with a given topic times the probability that the topic appears in a document. After several iterations, the probabilities that a token is associated with each topic converge to stable values, and each token is assigned to a topic (1 through k) having the highest probability.

The aLDA is augmented by assigning weights to extracted tokens, the weights influencing the respective probabilities and thus making topics associated with more heavily weighted tokens more likely to be "discovered." A topic is more likely discovered or identified the greater the number of tokens (words) corresponding to the topic drawn from the documents. A token (word) that appears more frequently and/or that is more heavily weighted than other tokens thus has a greater likelihood that a topic corresponding to that token will be identified.

The weights can be based on a group relationship graph. One or more group relationship graphs are stored in graph relationship graph database 214. A group relationship graph can be based on relationships between different individuals that belong to a specific group of individuals who exchange messages with one another over a specified time period. Different weights can be assigned to members of the group based on specific relationships. For example, a group can comprise a collaborative work group, and tokens (words) extracted from messages that originate from the leader of the group can be weighted more heavily than other tokens. If in the earlier example of a group making plans for lunch, user D were the team's leader, tokens (words) extracted from user D's 11:03 message can be weighted more highly so that a group topic model will more likely identify the topics (e.g., meat and its avoidance with respect to vegetarians) of importance to user D. User D's relationship to the other members of the group makes topics of importance to user D important to other members as well. If different members of the group have different levels of responsibility, weights reflecting the different levels of responsibility can be assigned to messages from each member.

In other embodiments, weights for augmenting the aLDA model can reflect the relative contributions of each member of a messaging group by weighting tokens extracted from messages of a user according to the number of messages a user contributes. Accordingly, in one embodiment, initial weights for all tokens can be set to one and the weights updated according to the formula (1+n)/N, where n corresponds to the number of messages attributed to a user and N is equal to the total number of messages in document.

Using a time-based job scheduler utility (e.g., Unix-based cron operating system utility), token processor 202 can periodically, at scheduled time intervals, extract tokens from recent messages accessible by system 200. Classifier modeler 204 can query the processed tokens database 210 periodically to determine whether and, if so, how many newly processed tokens (from recent messages) have been stored in the database. Accordingly, classifier modeler 204 optionally updates the set of documents and topic models based on documents newly created at periodic intervals based on new messages.

System 200 illustratively comprises two types of topic models generated by classifier modeler 204. One type, group topic model 216, pertains to a group, such as a chat group, collaborative work group, or other group of users that exchange messages over time. Different group topic models corresponding to specific time spans can be generated for different groups of users. The other type, individual topic model 218, pertains to individual members of a group.

Group topic model 216 is constructed based on documents (AMDs) created by querying processed tokens database 210 and collecting messages whose IDs correspond to specific members of a group (e.g., chat group, collaborative work group) and which are identified as having been exchanged within a specified time period. Based on the documents, group topic model 216 is constructed using machine learning, as described above. Individual topic model 218 is constructed based on an individual-specific document created from messages identified with a specific individual member. The individual-specific document is combined with group topic model 216 for constructing individual topic model 218. Individual topic models reflect topics relevant to specific individuals, whereas the group topic model relates to topics relevant in the specific context of an identifiable group. Each such model indicates groups of words (tokenized) that correspond to topics. Because the topics are generated from documents that aggregate messages of a specific group of individuals during a specific timeframe, the topics reflect particular aspects of the individuals (e.g., views, opinions, objectives). Both types of models thus can be used to identify topics, and more particularly, words associated with topics that determine whether a message intended for the group or for one or more individuals in the group is unsuitable for sending.

Group topic model 216 and individual topic model 218, based on the machine learning described, associate tokens (words) with topics. When a new message is created, token processor 202 extracts tokens from the message prior to the message being conveyed over communications network 106. Token classifier 206 determines whether any of the words correspond to topics that make the message unsuitable for sending. A topic can be designated as one whose associated words make the message unsuitable for sending based on user input to token classifier 206 and/or based on general information collected in general knowledge database 220, as described in greater detail below. The leader of a collaborative work group, for example, may indicate that topics (and hence the associated words) pertaining to a research and development project are restricted in so far as any message relating to the topics should not be sent to anyone other than a team member. A member of a chat group that includes a strict vegetarian, for example, may designate topics pertaining to meat consumption as topic whose associated words render a message unsuitable for sending. Alternatively, the knowledge that vegetarians are offended by meat consumption may be obtained from general knowledge database 220.

In some embodiments, a system for determining message suitability includes an enhanced neural net image caption generator that, as disclosed herein, combines the capabilities of image recognition and topic modeling. The enhanced neural net image caption generator, in accordance with some embodiments, performs image recognition using a convolutional neural network to identify and caption objects in an image. The corresponding caption is input into a probabilistic topic model for training the model using machine learning. The probabilistic model, once trained, can associate a topic corresponding to an image appearing in a newly presented message. The enhanced neural net image caption generator, as with other elements of a system for determining message suitability, can be implemented in various embodiments in a set of computer system-executable instructions, in dedicated circuitry, or a combination of dedicated circuitry and computer system-executable instructions.

Figure 3A:
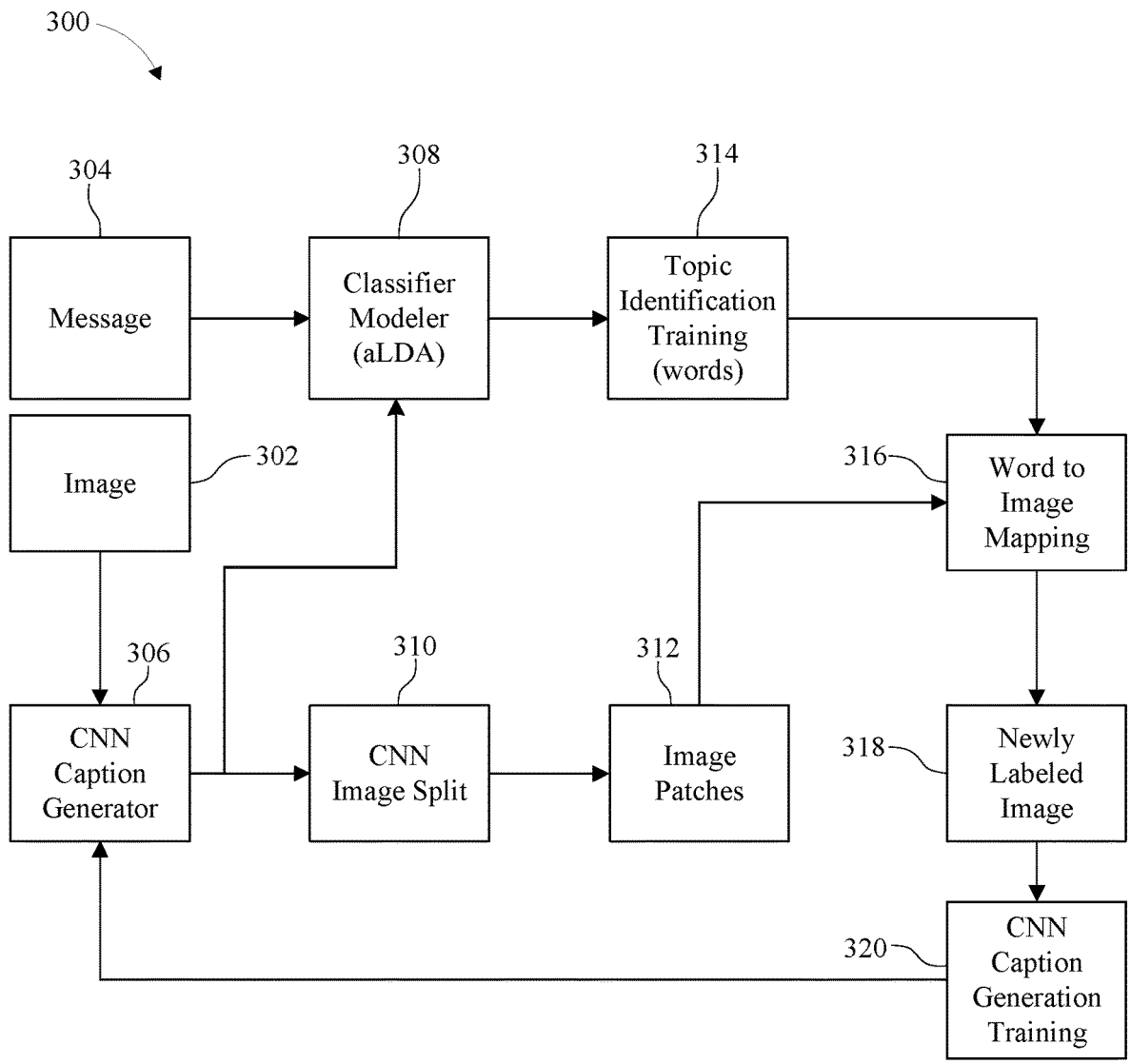
FIGS. 3A and 3B schematically illustrate certain operative features of an enhanced neural net image caption generator according to an embodiment.
Figure 3B:
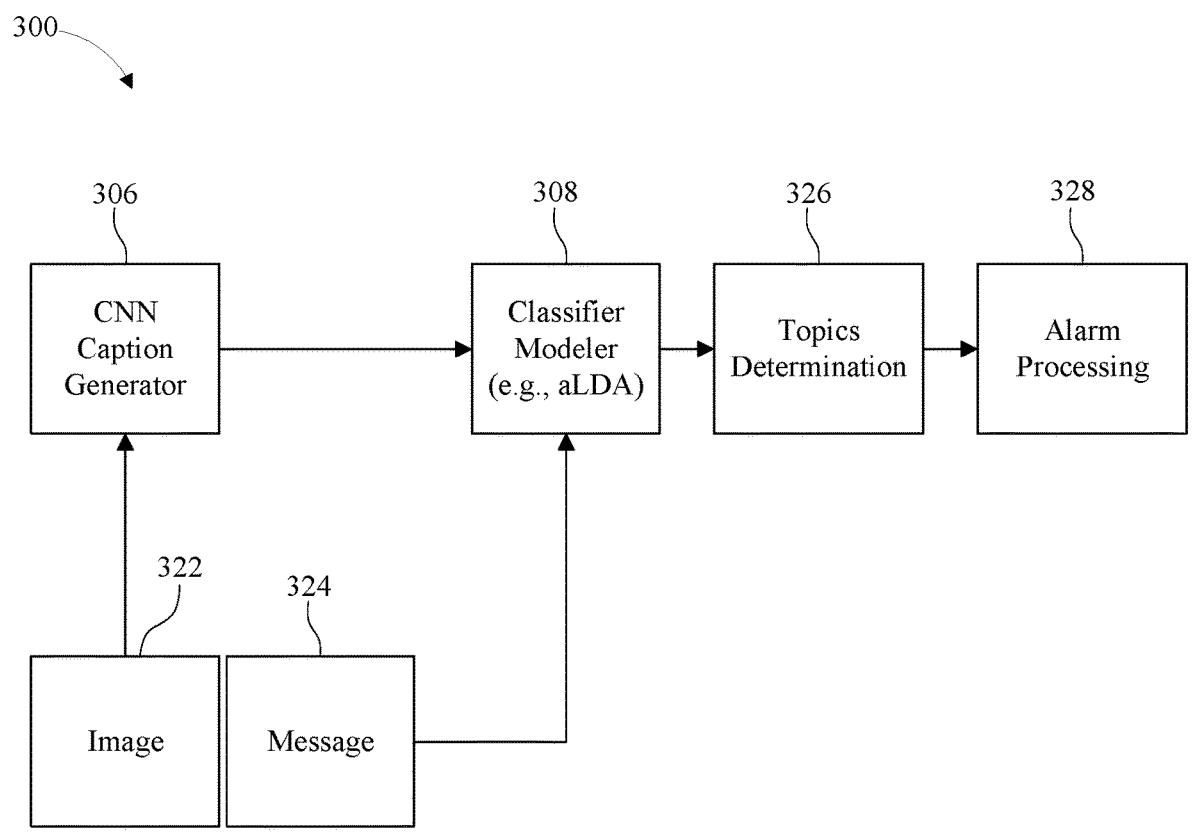

FIGS. 3A and 3B illustrate certain features 300 of an enhanced neural net image caption generator according to one embodiment. FIG. 3A depicts certain training aspects of the enhanced neural net image caption generator, the training based on machine learning using a set of training examples. A machine learning training example illustratively comprises image 302 and corresponding message 304. Image 302 is input into convolutional neural network (CNN) caption generator 306, which generates an image caption corresponding to image 302. The image caption and message 304 corresponding to image 302 are input into classifier modeler 308 (e.g., the aLDA described above). CNN caption generator 306 can generate a caption using a fixed vocabulary, the caption describing objects or content within image 302. CNN caption generator 306 can be implemented, for example, using an encoder model (e.g., a deep learning convolutional neural network) and decoder (e.g., a long short-term memory (LSTM) neural network) model that is trained conditionally on the encoding by the encoder model to output text (e.g., word, phrase, or sentence) that describes or otherwise identifies the objects or content within image 302.

Operatively, CNN caption generator 306 efficiently predicts an object within an image, in part, by distinguishing close-together pixels that correspond to the same object from the close-together pixels that correspond to edges of different objects—that is, parts of an image where two different objects touch one another. Each pixel of image 302 is a feature (e.g., a 100-by-100 pixels image can be represented by 10,000 features of a feature vector). At block 310, CNN caption generator 306 can split image 302 into square patches 312 using a moving window, and multiple regression models (e.g., single-layer perceptron) can each receive an image patch for machine learning to detect a specific pattern (e.g., one small regression model can learn to detect sky, another to detect grass, and a third to detect a building). Through machine learning, each small regression model learns the parameters of a filter using gradient descent with backpropagation. Through successive iterations, each filter slides—or convolves—over the patches of an image. At each iteration, a convolution is computed (e.g., the convolution value is greater the more a patch "looks like" a filter corresponding to a specific object) and a nonlinear activation function (e.g., rectified linear unit (ReLU) function) is applied to the sum of the convolutions. Once trained, the CNN can predict, based on model-generated values, objects within an image. Using such techniques, CNN caption generator 306 can be trained to identify objects within an image such as image 302 and apply a caption describing the object. Classifier modeler 308 extracts tokens (words) from corresponding message 304 at block 314 for identifying topics and maps the tokens to the image at block 316 to generate newly labeled image 318. The label can identify a topic associated with the objects in image 302. At block 320, the newly labeled image (now associated with a corresponding topic) is used to train CNN caption generator 306.

FIG. 3B depicts certain operations performed by the enhanced neural net image caption generator once trained using machine learning. An image 322 and corresponding message 324 are input into enhanced neural net image caption generator. Image 322 is processed by the CNN caption generator 306, the output of which is conveyed to classifier modeler 308 along with corresponding message 324. Classifier modeler 308 at block 326 determines a topic associated with image 322 and classifies the image accordingly. If image 322 is classified as unsuitable for sending as part of a message, alarm processing is invoked at block 328 for generating a warning that the message is unsuitable for sending.

Certain operative features of the enhanced neural net image caption generator can be demonstrated in the context of the above-described group chat example in which colleagues exchange messages regarding meeting for lunch. As described above, one user (User B) sends to the group a message accompanied by a picture that includes a meat platter, which evokes a follow-up response warning that some members of the group are strict vegetarians and object to eating meat. The message exchange, including the image, can provide a training example for training the enhanced neural net image caption generator to recognize certain objects (meat) and a topic model can learn to associate the objects with a topic determined to be objectionable for certain members of a particular group of individuals. Accordingly, if during a subsequent exchange of messages involving members of the group, one member prepares a message that includes an image showing prepared meats, a warning is sent to the member prior to the message being sent. The warning indicates that the message is unsuitable for sending given that the message refers to a topic (eating meat) that at least some members find objectionable. In an example implementation, the system may query the user whether to proceed with sending the message or discard the message so that the message is not delivered to the originally intended recipients.

Figure 4:
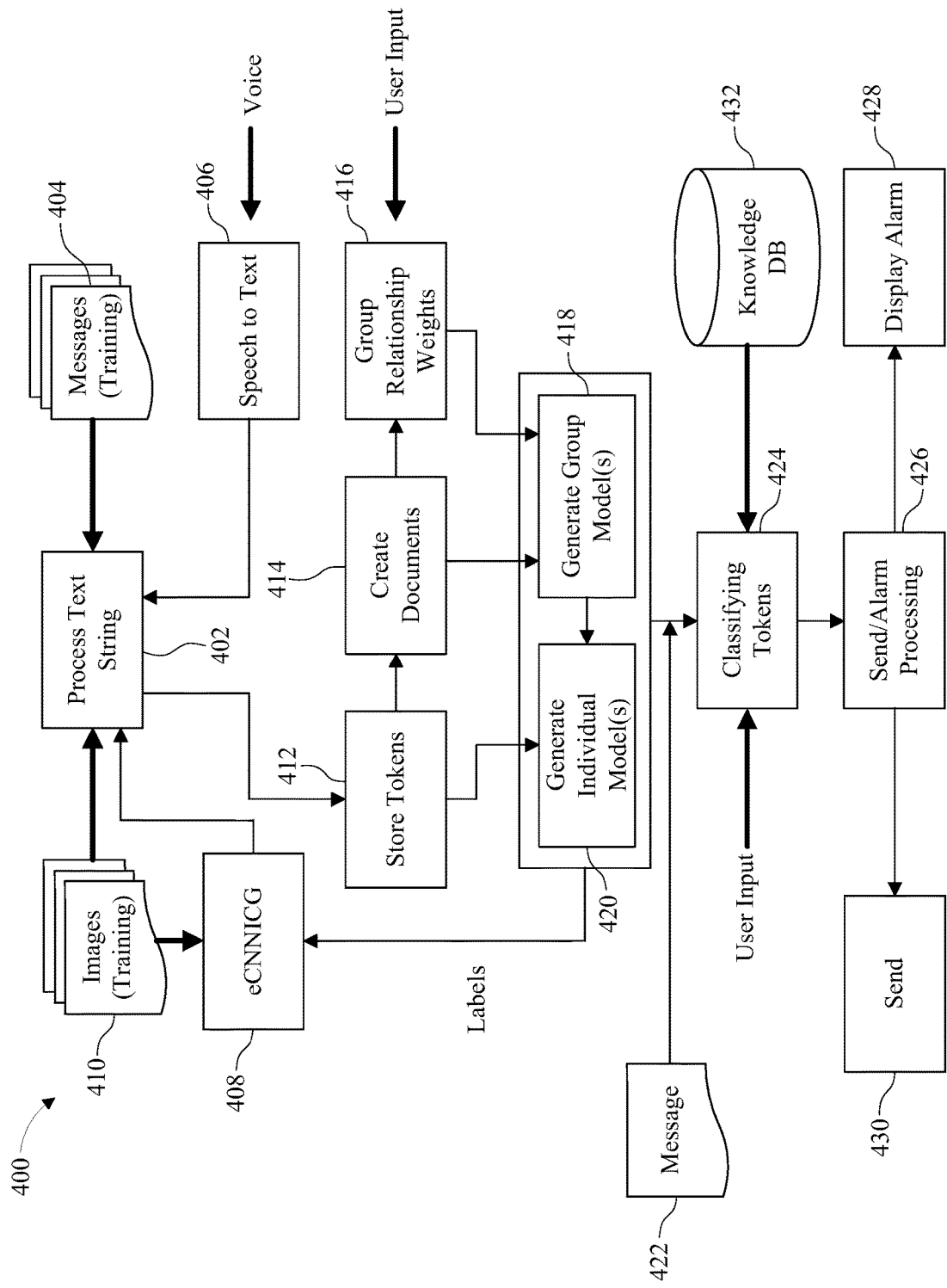
FIG. 4 schematically illustrates certain operative features of a system for determining message suitability according to an embodiment.

FIG. 4 schematically depicts certain operative features 400 of a system for determining message suitability such as system 200 in FIG. 2, according to an embodiment. At block 402, text strings collected from one or more sources are processed. Text messages, voice messages, and images provide sources of the text strings. Text strings can be extracted from one or more text messages 404, generated by converting speech to text 406, and/or generated by enhanced neural net image caption generator (eNNICG) 408 based on and corresponding to one or more images 410. The processing at block 402 extracts tokens (words) from the collected text strings (messages), which are then stored at block 412 in a processed token database. At block 414, the tokens are used to create documents for training one or more machine learning classification models. The machine learning can be augmented by weighting the tokens comprising the training documents, the weights based on one or more group relationship graphs created at block 416. A group relationship graph can be constructed from explicit user input. Based on the documents one or more group models is generated at block 418. Based on a group model and individualized documents, individual models are generated at block 420.

Text strings can be collected and processed on an on-going basis to keep the models generated from text strings up to date and relevant. The collection can be performed intermittently at designated time intervals determined using, for example, a job scheduler operating system utility. At the designated time intervals, the processed token database can be queried for newly created messages and various classification models updated based on the new messages. The tokens comprise discrete messages and can be annotated when saved at block 412. For example, messages can be annotated according to one or more of the following indicators: a "message saved time"; a "message ID"; a "message source"; a "chat group ID"; a "message sender ID"; and/or a "message recipient ID." A document (AMD) can be created for each group based on the group ID and can incorporate messages exchanged over a specified period of time. Concurrently with the document creation, new group relationship graphs can be created and/or existing ones updated depending on any changing circumstances related to the groups.

Creation of new message 422 by a user invokes a classifying of tokens (words) in the message at block 424. The tokens are extracted from the message by the token processor and compared to tokens stored in system memory that have been determined to be related to topics that render a message unsuited for sending. At block 426, a processor displays an alarm at block 428 if one or more tokens extracted from the message include ones identified based on topics determined by a group topic model or individual topic model as objectionable. If the message is determined to be unsuited for sending, the processor optionally can block the sending of the message automatically without any response or input from the user. Otherwise, if the message does not include one or more tokens that are identified as objectionable, then the processor sends the message to the intended recipients at block 430.

Optionally, if a message is not classified as unsuitable for sending, but a user is nevertheless unsure of the message's appropriateness, the user can access knowledge database 432. If based on the knowledge gained, the user determines the message should be classified unsuitable for sending, the user can input information directly and/or incorporate information from knowledge database 432 into the system for update or refine one or more topic models used by the system's token classifier.

Figure 5:
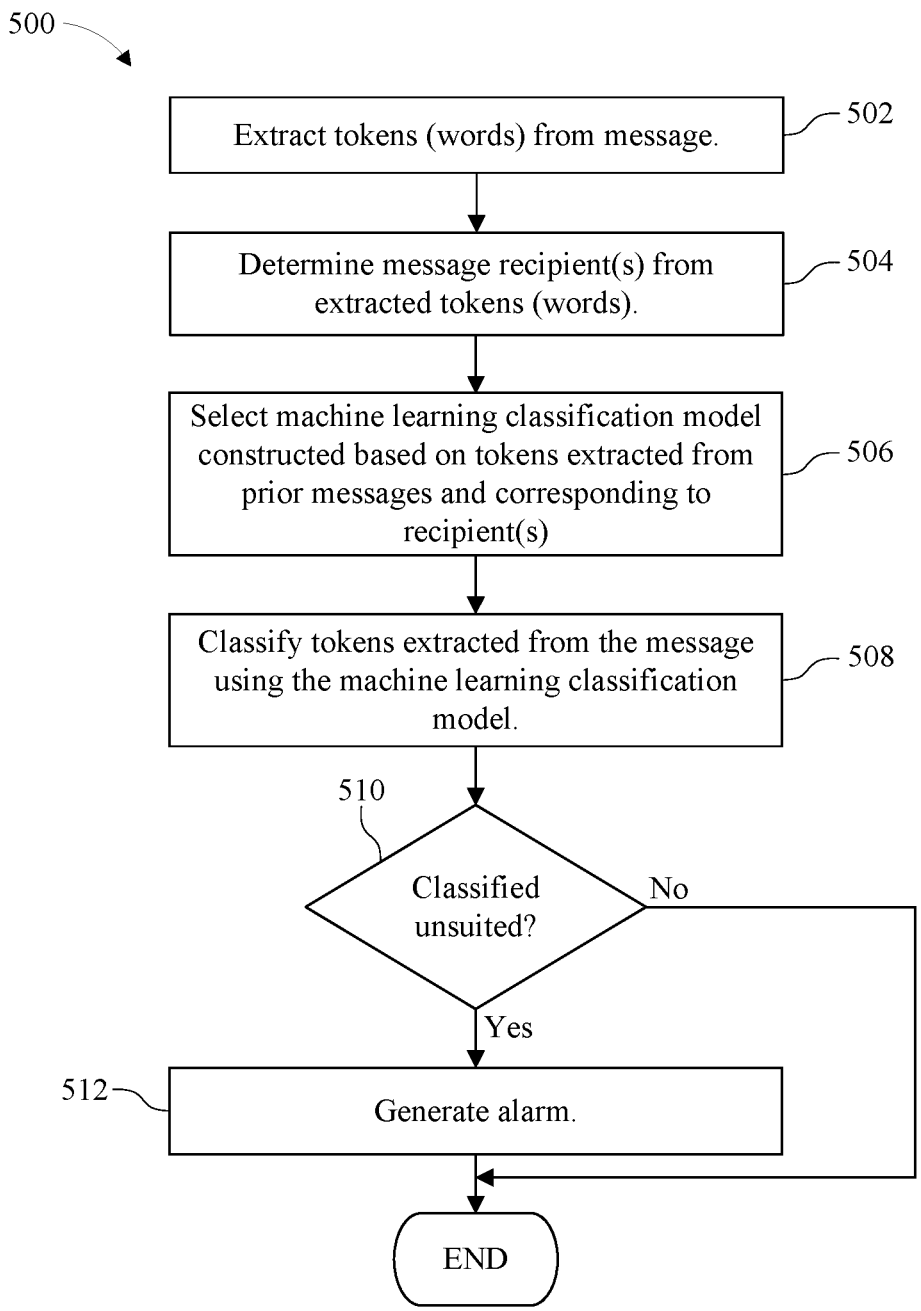
FIG. 5 is a flowchart of a method of determining message suitability based on images according to an embodiment.

FIG. 5 is a flowchart of method 500 for determining message suitability, according to an embodiment. Method 500 can be performed by a system the same or similar to the systems described with reference to FIGS. 1-4. The system at block 502 extracts tokens (words) from a message prior to transmitting the message over a communications network. At block 504, the system determines from the tokens one or more intended recipients of the message. The system selects a machine learning classification model corresponding to the one or more recipients of the message at block 506. The machine learning classification model can be constructed based on tokens extracted from prior messages that are combined to create a plurality of documents for training the machine learning classification model. At block 508, the system classifies the tokens extracted from the message using the machine learning classification model. If at block 510 the system determines based on the classifying that the message is unsuited for sending, then the system, at block 512, can generate an alert message in response to determining that the message is unsuited for sending.

The machine learning classification model can be a group topic model or an individual topic model (corresponding to a member of a group), the model created based on messages exchanged by a specific group over a specific span of time. An individual topic model corresponds to a designated recipient of a message that is not addressed to the full group.

In certain embodiments, the machine learning classification model is a probabilistic topic model that statistically predicts at least one topic for characterizing the language content of the plurality of documents. The probabilistic topic model can be an aLDA model, which is augmented based on a group relationship graph.

In some embodiments, different ones of the plurality of documents are individually created at periodic intervals over a predetermined time period. For example, a periodic determination can be made whether the sender and recipient(s) of the message have exchanged messages subsequent to the creation of the documents. If so, one or more new documents can be created and, based on the newly created document(s), the machine learning classification model can be updated. Accordingly, new topics may be identified, some of which can comprise words (tokens) that if included in a message make the message unsuited for sending.

In other embodiments, the message and/or one or more prior messages can comprise a text string generated in response to identifying an object within an image using machine learning image recognition. The machine learning image recognition can be performed by an enhanced neural net image caption generator. The enhanced neural net image caption generator can recognize an image and generate a corresponding caption (e.g., using a CNN caption generator), and associate the image with a topic based on a probabilistic topic model determination (e.g., made with an aLDA). In still other embodiments, the message and/or one or more prior messages can comprise a text string that is generated by converting a voice-based message to text using a speech-to-text processor.

Figure 6:
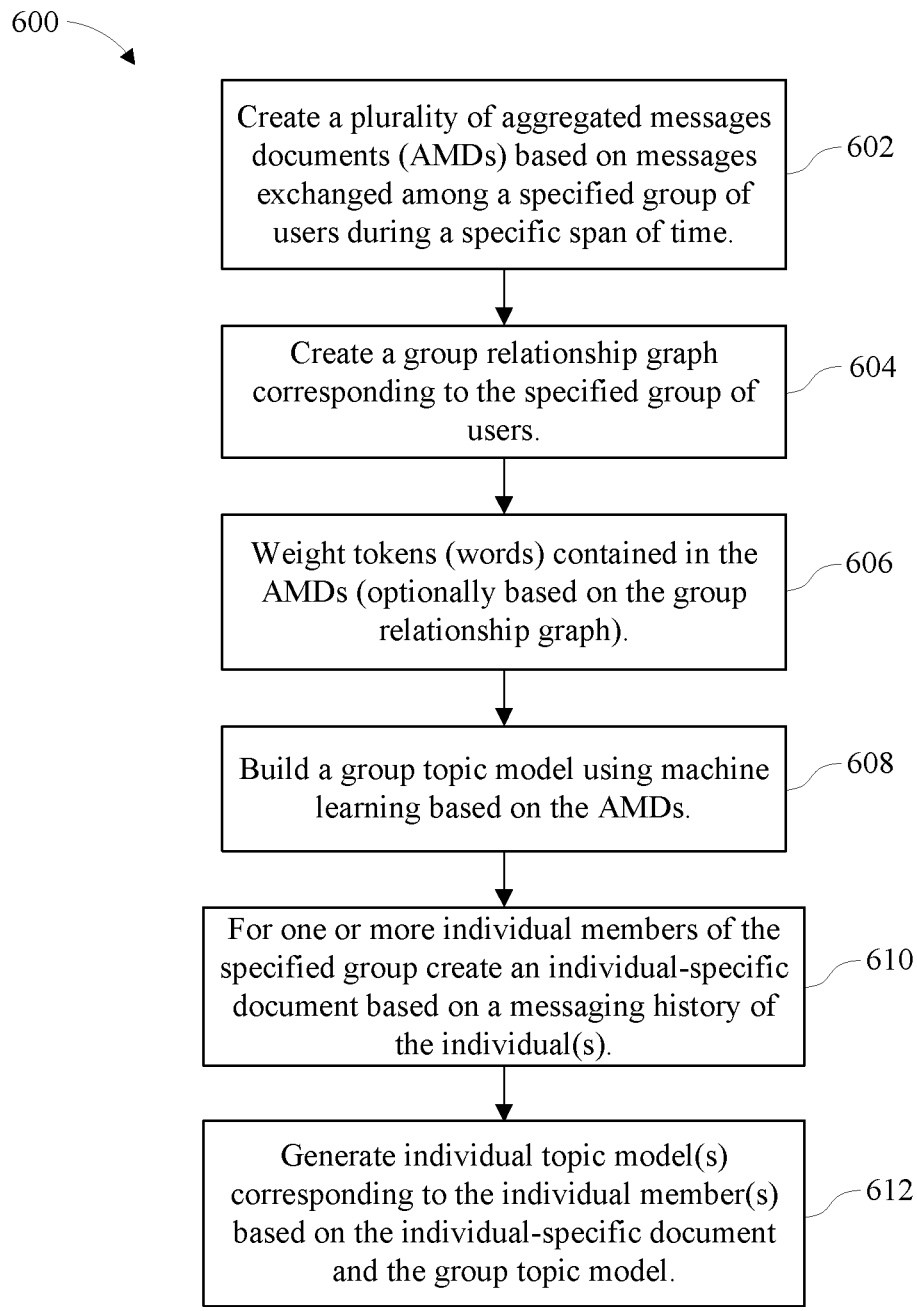
FIG. 6 is a flowchart of a method of creating a group topic model and individual topic model according to an embodiment.

FIG. 6 is a flowchart of method 600 for generating a topic model according to an embodiment. Method 600 can be performed by a system the same or similar to the systems described with reference to FIGS. 1-6. The system at block 602 creates a plurality of aggregated messages documents (AMDs). The AMDs can be based on messages exchanged among a specified group of users during a specific span of time. Optionally, a block 604, the system can create, in response to user input, a group relationship graph based on a set of predefined relationships among the specified group of users. Tokens (words) contained in the AMDS can optionally be weighted at block 606. The weights can be determined based on the optionally created group relationship graph. For example, if the specified group comprises a collaborative work group, words contained in messages authored by the collaborative work group's leader can be weighted more heavily than are those contained in messages authored by other members of the collaborative work group. Weights can be determined according to other criteria as well. For example, weights can be determined based on the relative number of messages originating from each member of a chat group.

At block 608, the system builds a group topic model. The group topic model can be constructed using machine learning, wherein the group-specific, time-specific AMDs are used to train the group topic model. In some embodiments the group topic model is trained using machine learning based on a probabilistic topic model. The probabilistic topic model can be an aLDA model. Optionally, for one or more individual members of the specified group an individual-specific document based on the messaging history of the individual(s) can be created at block 610. At block 612, one or more individual topic models optionally can be created based on one or more individual's messaging history and the group topic model. An individual topic model is a topic model that corresponds to an individual member of the specified group and thus reflects the specific interests, opinions, concerns, feelings, emotions, and the like as expressed by messages gathered as part of the individual's messaging history and captured by the group topic model.

Figure 7:
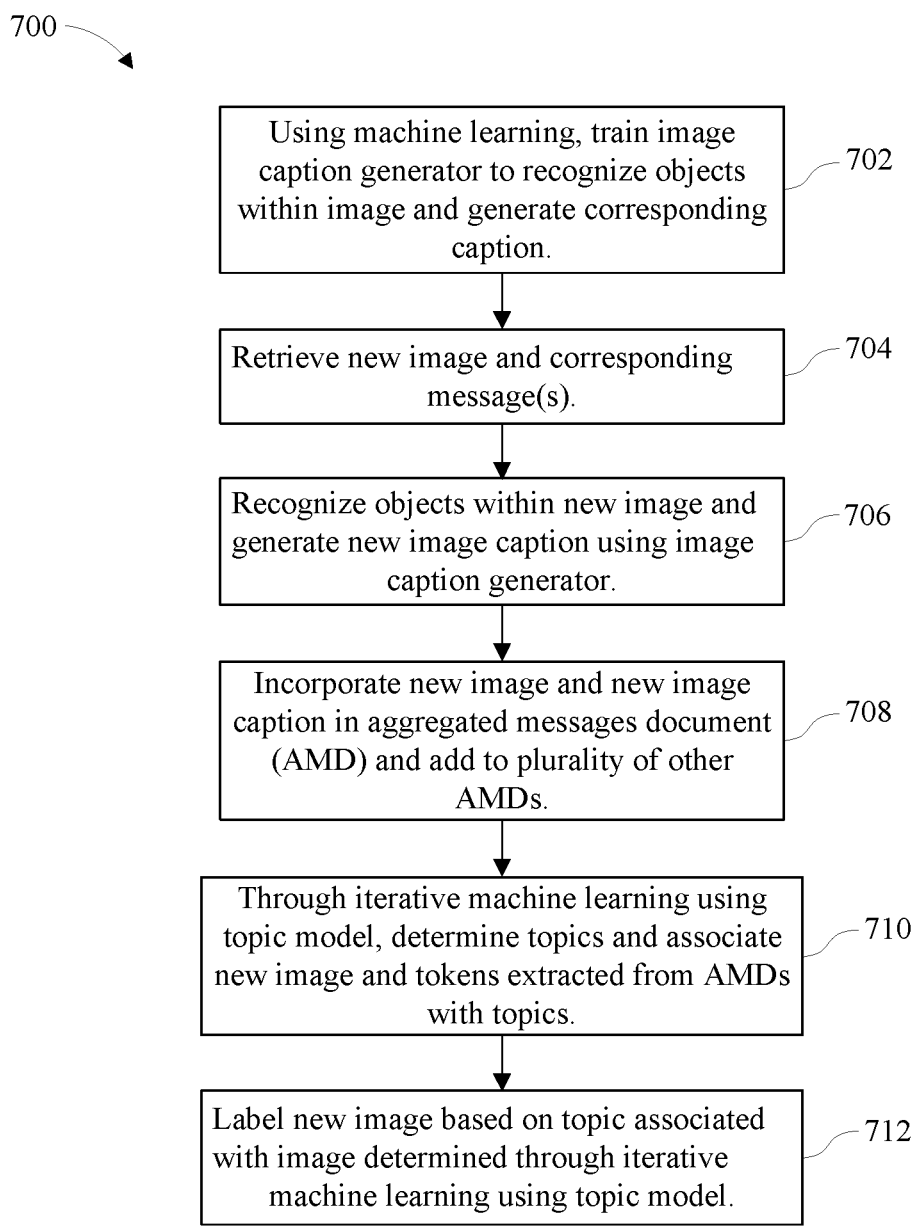
FIG. 7 is a flowchart of a method of training an enhanced neural net image caption generator with machine learning according to an embodiment.

FIG. 7 is a flowchart of method 700 for training an enhanced neural net image caption generator according to an embodiment. Method 700 can be performed by a system the same or similar to the systems described with reference to FIGS. 1-4. The system, at block 702, trains an image caption generator to recognize objects within an image input to the system and to generate a caption corresponding to the image. The image caption generator can be trained using machine learning. In some embodiments, the image caption generator can comprise a convolutional neural network that uses image pixels as features for learning image recognition based on a set of example training images. At block 704, the system retrieves a new image and one or more messages corresponding to the image. The one or more messages can provide a chat context for the image. Using the image caption generator, image recognition is performed by the system at block 706 to recognize objects within the new image and to generate a new image caption that corresponds to the new image. At block 708, the system incorporates the new image and corresponding caption into an AMD and adds the AMD to other AMDs for constructing a topic model (e.g., group topic model and/or individual topic model) corresponding to a specific group of users (e.g., chat group, collaborative work group) based on messages exchanged over a specific span of time. Through an iterative, machine learning process using a topic model, the system at block 710 determines discrete topics and associates the new image and tokens (words) extracted from the AMDs. The new image, block 712, is labeled, the label based on the topic associated with the new image as determined through the iterative machine learning process using the topic model.

It is understood in advance that although this disclosure includes a detailed description on cloud computing, implementations of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
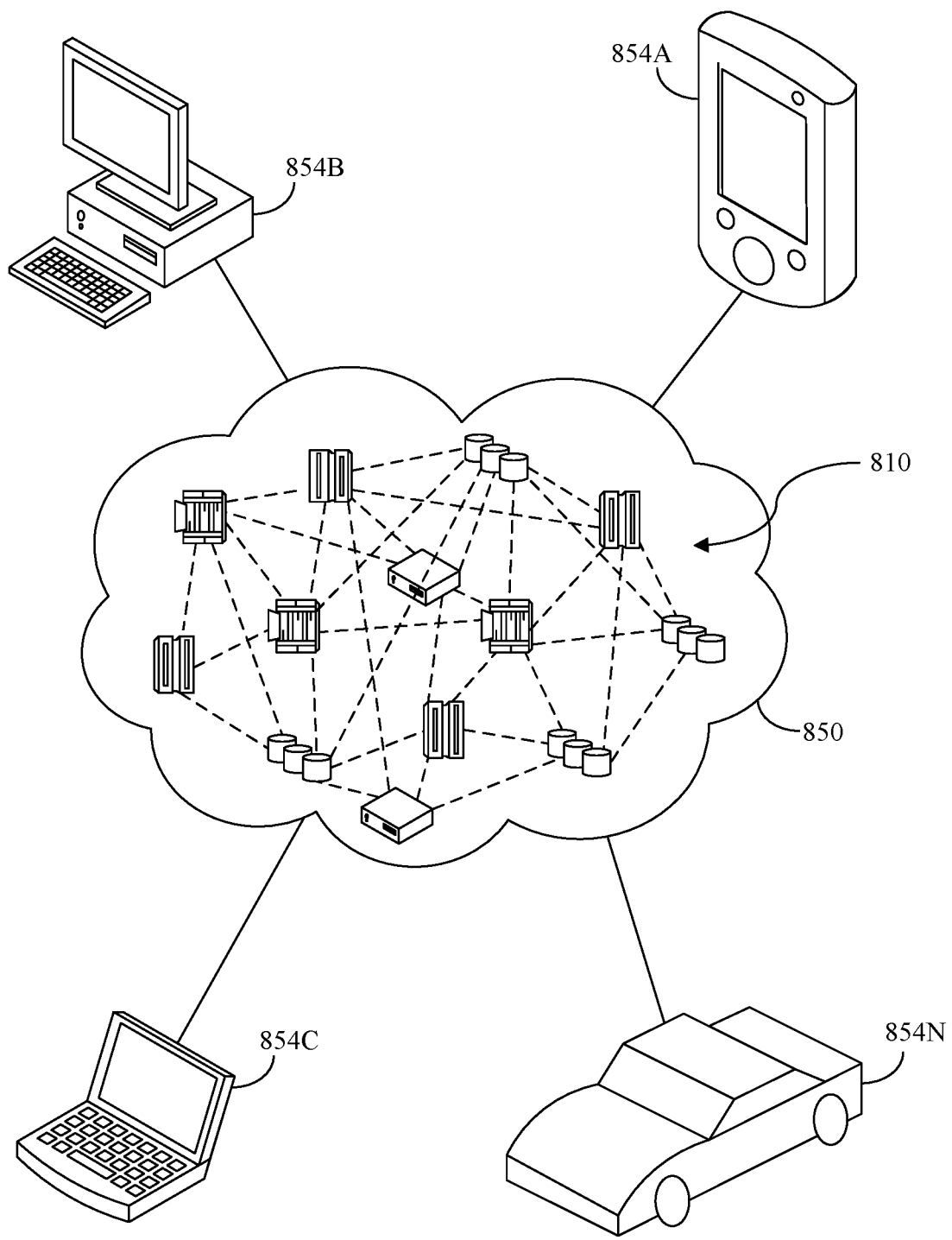
FIG. 8 depicts a cloud computing environment according to an embodiment.

Referring now to FIG. 8, illustrative computing environment 850 is depicted. As shown, cloud computing environment 850 includes one or more computing nodes 810 with which local computing devices used by cloud consumers, such as, for example, personal digital assistant (PDA) or cellular telephone 854*a*, desktop computer 854*b*, laptop computer 854*c*, and/or automobile computer system 854*n* may communicate. Computing nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854*a*-854*n* shown in FIG. 8 are intended to be illustrative only and that computing nodes 810 and cloud computing environment 850 can communicate with any type of computerized device over any type of network and/or network addressable connection (e.g., using a web browser).

Figure 9:
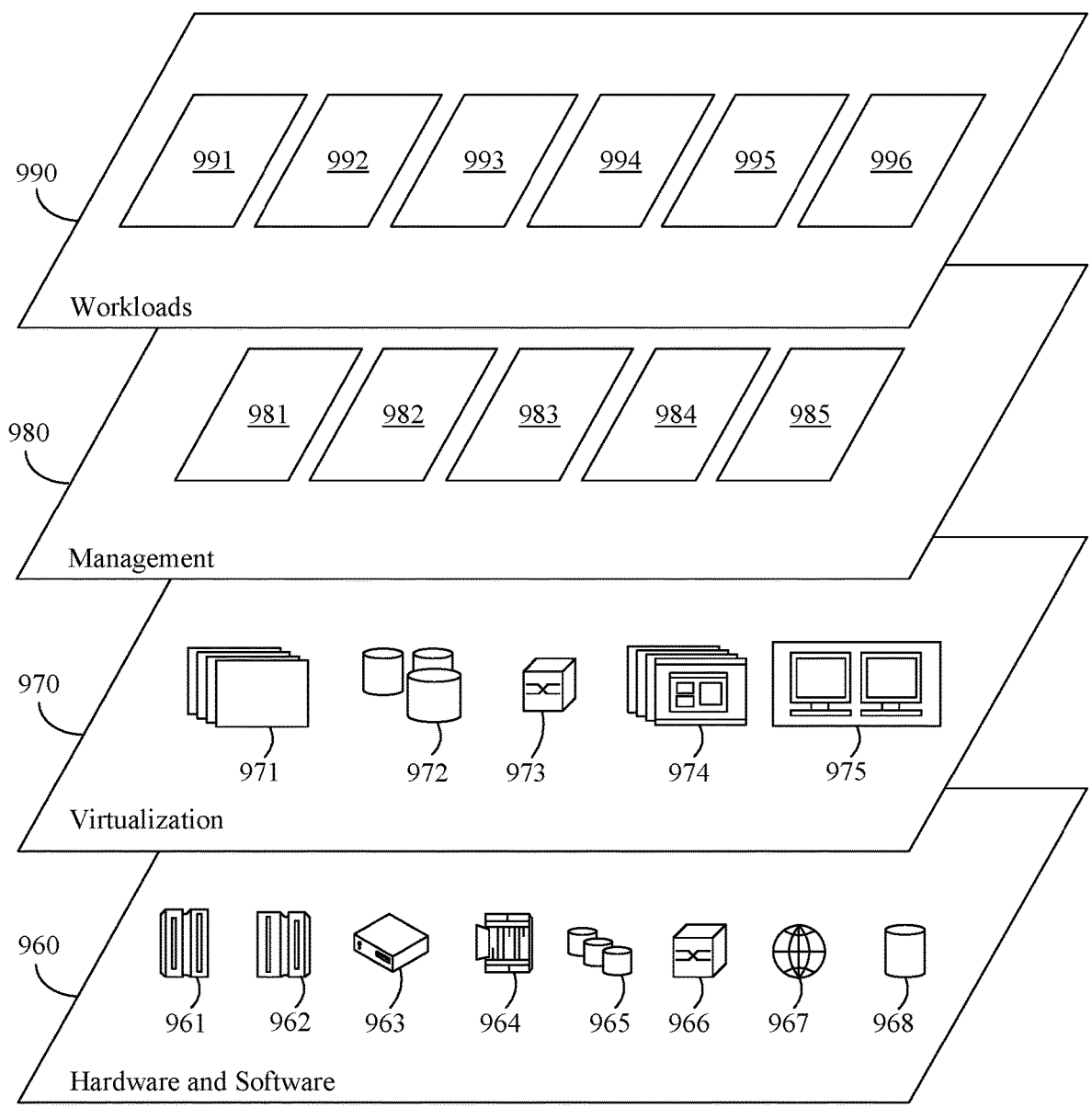
FIG. 9 depicts abstraction model layers according to an embodiment.

Referring now to FIG. 9, a set of functional abstraction layers provided by cloud computing environment 950 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA. Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and system 996 for determining message suitability/unsuitability.

Figure 10:
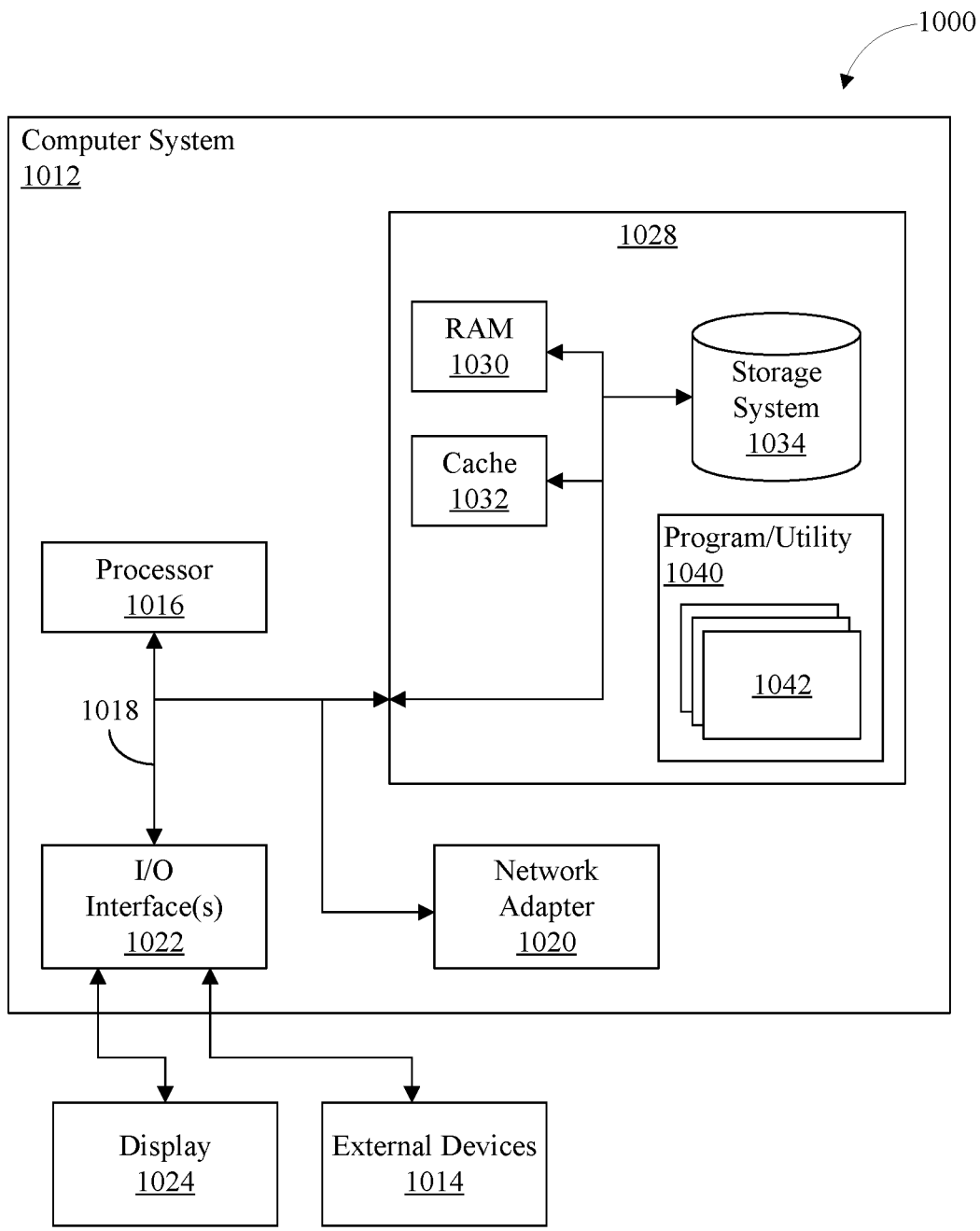
FIG. 10 depicts a cloud computing node according to an embodiment.

FIG. 10 illustrates a schematic of an example of a computing node 1000. In one or more embodiments, computing node 1000 is an example of a suitable cloud computing node. Computing node 1000 is not intended to suggest any limitation as to the scope of use or functionality of embodiments of the invention described herein. Computing node 1000 is capable of performing any of the functionality described within this disclosure.

Computing node 1000 includes a computer system 1012, which is operational with numerous other general-purpose or special-purpose computing system environments or configurations. Examples of well-known computing systems, environments, and/or configurations that may be suitable for use with computer system 1012 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 1012 may be described in the general context of computer system-executable instructions, such as program modules, being executed by a computer system. Generally, program modules may include routines, programs, objects, components, logic, data structures, and so on that perform particular tasks or implement particular abstract data types. Computer system 1012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system 1012 is shown in the form of a general-purpose computing device. The components of computer system 1012 may include, but are not limited to, one or more processors 1016, a memory 1028, and a bus 1018 that couples various system components including memory 1028 to processor 1016. As defined herein, "processor" means at least one hardware circuit configured to carry out instructions. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

Bus 1018 represents one or more of any of several types of bus structures, including a memory bus or memory controller, a peripheral bus, an accelerated graphics port, and a processor or local bus using any of a variety of bus architectures. By way of example only, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Computer system 1012 typically includes a variety of computer system-readable media. Such media may be any available media that is accessible by computer system 1012, and may include both volatile and non-volatile media, removable and non-removable media.

Memory 1028 may include computer system readable media in the form of volatile memory, such as random-access memory (RAM) 1030 and/or cache memory 1032. Computer system 1012 may further include other removable/non-removable, volatile/non-volatile computer system storage media. By way of example, storage system 1034 can be provided for reading from and writing to a non-removable, non-volatile magnetic media and/or solid-state drive(s) (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1018 by one or more data media interfaces. As will be further depicted and described below, memory 1028 may include at least one program product having a set (e.g., at least one) of program modules that are configured to carry out the functions of embodiments of the invention.

Program/utility 1040, having a set (at least one) of program modules 1042, may be stored in memory 1028 by way of example, and not limitation, as well as an operating system, one or more application programs, other program modules, and program data. Each of the operating system, one or more application programs, other program modules, and program data or some combination thereof, may include an implementation of a networking environment. Program modules 1042 generally carry out the functions and/or methodologies of embodiments of the invention as described herein. For example, one or more of the program modules may include modules for implementing a system for determining message suitability, or portions thereof.

Program/utility 1040 is executable by processor 1016. Program/utility 1040 and any data items used, generated, and/or operated upon by computer system 1012 are functional data structures that impart functionality when employed by computer system 1012. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer system 1012 may also communicate with one or more external devices 1014 such as a keyboard, a pointing device, a display 1024, etc.; one or more devices that enable a user to interact with computer system 1012; and/or any devices (e.g., network card, modem, etc.) that enable computer system 1012 to communicate with one or more other computing devices. Such communication can occur via input/output (I/O) interfaces 1022. Still, computer system 1012 can communicate with one or more networks such as a local area network (LAN), a general wide area network (WAN), and/or a public network (e.g., the Internet) via network adapter 1020. As depicted, network adapter 1020 communicates with the other components of computer system 1012 via bus 1018. It should be understood that although not shown, other hardware and/or software components could be used in conjunction with computer system 1012. Examples, include, but are not limited to: microcode, device drivers, redundant processing units, external disk drive arrays, RAID systems, tape drives, and data archival storage systems, etc.

While computing node 1000 is used to illustrate an example of a cloud computing node, it should be appreciated that a computer system using an architecture the same as or similar to that described in connection with FIG. 10 may be used in a non-cloud computing implementation to perform the various operations described herein. In this regard, the example embodiments described herein are not intended to be limited to a cloud computing environment. Computing node 1000 is an example of a data processing system. As defined herein, "data processing system" means one or more hardware systems configured to process data, each hardware system including at least one processor programmed to initiate operations and memory.

Computing node 1000 is an example of computer hardware. Computing node 1000 may include fewer components than shown or additional components not illustrated in FIG. 10 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Computing node 1000 is also an example of a server. As defined herein, "server" means a data processing system configured to share services with one or more other data processing systems. As defined herein, "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. In one or more embodiments, the various user devices described herein may be client devices. Network infrastructure, such as routers, firewalls, switches, access points and the like, are not client devices as the term "client device" is defined herein.

The terminology used herein is only for the purpose of describing particular embodiments and is not intended to be limiting. Notwithstanding, several definitions that apply throughout this document are now presented.

As defined herein, the singular forms of terms "a," "an," and "the" are intended to include the plural forms as well, unless the context clearly indicates otherwise.

As defined herein, "another" means at least a second or more.

As defined herein, "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, "automatically" means without user intervention.

As defined herein, "computer readable storage medium" means a storage medium that contains or stores program code for use by or in connection with an instruction execution system, apparatus, or device. "Computer readable storage medium," as defined herein, is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. Memory elements, as described herein, are examples of a computer readable storage medium. A non-exhaustive list of more specific examples of a computer readable storage medium may include: a portable computer diskette, a hard disk, a random-access memory (RAM), a read-only memory (ROM), an erasable programmable read-only memory (EPROM or Flash memory), a static random-access memory (SRAM), a digital versatile disk (DVD), a memory stick, a floppy disk, or the like.

As defined herein, "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, "if" means "when" or "upon" or "in response to" or "responsive to," depending upon the context. Thus, the phrase "if it is determined" or "if [a stated condition or event] is determined" may be construed to mean "upon determining" or "in response to determining." Similarly the phrase "if it is detected" or "if [a stated condition or event] is detected" may be construed to mean "in response to detecting [the stated condition or event]" or "responsive to detecting [the stated condition or event]" depending on the context.

As defined herein, "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, "output" means storing in physical memory elements, e.g., devices, writing to display or other peripheral output device, sending or transmitting to another system, exporting, or the like.

As defined herein, "processor" means at least one hardware circuit configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application-specific integrated circuitry (ASIC), programmable logic circuitry, and a controller.

As defined herein, "real time" means a level of processing responsiveness that a user or system senses as sufficiently immediate for a particular process or determination to be made, or that enables the processor to keep up with some external process.

As defined herein, "in response to" and "responsive to" mean responding or reacting readily to an action or event. Thus, if a second action is performed "in response to" or "responsive to" a first action, there is a causal relationship between an occurrence of the first action and an occurrence of the second action. The terms "in response to" and "responsive to" indicate the causal relationship.

As defined herein, "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

As defined herein, the terms "user," "individual," "member," and "author" refer to a human being. Accordingly, "users," "individuals," "members," and "authors" refer to multiple human beings.

The terms first, second, etc. may be used herein to describe various elements. These elements should not be limited by these terms, as these terms are only used to distinguish one element from another unless stated otherwise or the context clearly indicates otherwise.

Various embodiments of the inventive aspects disclosed herein may be implemented in a system, as a method, and/or in a computer program product at any possible technical detail level of integration. The computer program product may include a computer readable storage medium (or media) having computer readable program instructions thereon for causing a processor to carry out aspects of the embodiments disclosed herein. "Program code" is used interchangeably with "computer readable program instructions" within this disclosure. Computer readable program instructions described herein may be downloaded to respective computing/processing devices from a computer readable storage medium or to an external computer or external storage device via a network, such as the Internet, a LAN, a WAN, and/or a wireless network. The network may include copper transmission cables, optical transmission fibers, wireless transmissions, routers, firewalls, switches, gateway computers, and/or edge devices including edge servers. A network adapter cord or network interface in each computing/processing device receives computer readable program instructions from the network and forwards the computer readable program instructions for storage in a computer readable storage medium with the respective computing/processing device.

Computer readable program instructions for carrying out operations of the inventive arrangements disclosed herein may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language and/or procedural programming languages. The computer readable program instructions may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products according to embodiments of the inventive arrangements. It will be understood that each block of the flowchart illustrations and/or block diagrams, and combinations of blocks in the flowchart illustrations and/or block diagrams, can be implemented by computer readable program instructions (e.g., program code).

These computer readable program instructions may be provided to a processor of a computer, special-purpose computer or other programmable data processing apparatus to produce a machine, such that the instructions, which execute via the processor of the computer or other programmable data processing apparatus, create means for implementing the functions/acts specified in the flowchart and/or block diagram block or blocks. Operatively coupling the processor to program code instructions transforms the machine of the processor into a special-purpose machine for carrying out the instructions of the program code. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the inventive arrangements described herein. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments provided herein have been presented for purposes of illustration and are not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art understand the embodiments disclosed herein. Modifications and variations may be apparent to those of ordinary skill in the art without departing from the scope and spirit of the described inventive arrangements. Accordingly, reference should be made to the following claims, rather than the foregoing disclosure, as indicating the scope of such features and implementations.

What is claimed is:

1. A method, comprising:
   extracting, with computer hardware, tokens from a message prior to transmitting the message over a communications network;
   determining from the tokens one or more intended recipients of the message;
   selecting a machine learning classification model corresponding to the one or more recipients of the message, the machine learning classification model constructed based on tokens extracted from prior messages, the prior messages being combined to create a plurality of documents for training the machine learning classification model;
   classifying one or more tokens extracted from the message using the machine learning classification model; and
   generating an alert message in response to determining based on the classifying that the message is unsuited for sending.

2. The method of claim 1, wherein
   the machine learning classification model is a probabilistic topic model that statistically predicts at least one topic for characterizing language content of the plurality of documents.

3. The method of claim 2, wherein
   the probabilistic topic model is an augmented latent Dirichlet allocation model augmented based on a group relationship graph.

4. The method of claim 1, wherein
   different ones of the plurality of documents are individually created at periodic intervals over a predetermined time period.

5. The method of claim 1, wherein
   at least one of the message or prior messages comprises a text string generated in response to identifying an object within an image using machine learning image recognition.

6. The method of claim 5, wherein
   the image recognition is performed by an enhanced neural net image caption generator.

7. The method of claim 1, wherein
   at least one of the message or prior messages comprises a text string that is generated by converting a voice-based message to text using a speech-to-text processor.

8. A system, comprising:
   a hardware processor configured to initiate operations including:
   extracting tokens from a message prior to transmitting the message over a communications network;
   determining from the tokens one or more intended recipients of the message;
   selecting a machine learning classification model corresponding to the one or more recipients of the message, the machine learning classification model constructed based on tokens extracted from prior messages, the prior messages being combined to create a plurality of documents for training the machine learning classification model;
   classifying one or more tokens extracted from the message using the machine learning classification model; and
   generating an alert message in response to determining based on the classifying that the message is unsuited for sending.

9. The system of claim 8, wherein
   the machine learning classification model is a probabilistic topic model that statistically predicts at least one topic for characterizing language content of the plurality of documents.

10. The system of claim 9, wherein
    the probabilistic topic model is an augmented latent Dirichlet allocation model augmented based on a group relationship graph.

11. The system of claim 8, wherein
    different ones of the plurality of documents are individually created at periodic intervals over a predetermined time period.

12. The system of claim 8, wherein
    at least one of the message or prior messages comprises a text string generated in response to identifying an object within an image using machine learning image recognition.

13. The system of claim 12, wherein
    the image recognition is performed by an enhanced neural net image caption generator.

14. A computer program product, the computer program product comprising:
    one or more computer-readable storage media and program instructions collectively stored on the one or more computer-readable storage media, the program instructions executable by a processor to cause the processor to initiate operations including:
    extracting tokens from a message prior to transmitting the message over a communications network;
    determining from the tokens one or more intended recipients of the message;
    selecting a machine learning classification model corresponding to the one or more recipients of the message, the machine learning classification model constructed based on tokens extracted from prior messages, the prior messages being combined to create a plurality of documents for training the machine learning classification model;
    classifying one or more tokens extracted from the message using the machine learning classification model; and generating an alert message in response to determining based on the classifying that the message is unsuited for sending.

15. The computer program product of claim 14, wherein the machine learning classification model is a probabilistic topic model that statistically predicts at least one topic for characterizing language content of the plurality of documents.

16. The computer program product of claim 15, wherein the probabilistic topic model is an augmented latent Dirichlet allocation model augmented based on a group relationship graph.

17. The computer program product of claim 14, wherein different ones of the plurality of documents are individually created at periodic intervals over a predetermined time period.

18. The computer program product of claim 14, wherein at least one of the message or prior messages comprises a text string generated in response to identifying an object within an image using machine learning image recognition.

19. The computer program product of claim 18, wherein the image recognition is performed by an enhanced neural net image caption generator.

20. The computer program product of claim 14, wherein at least one of the message or prior messages comprises a text string that is generated by converting a voice-based message to text using a speech-to-text processor.

* * * * *